United States Patent

Iwamoto et al.

[15] 3,675,195

[45] July 4, 1972

[54] APPARATUS FOR DETECTING TRAFFIC INFORMATION

[72] Inventors: Shunsuke Iwamoto; Ryohei Kawasaki, both of Kyoto, Japan

[73] Assignee: Omron Tateisi Electronics Co., Kyoto, Japan

[22] Filed: Nov. 18, 1969

[21] Appl. No.: 877,803

[30] Foreign Application Priority Data

Nov. 29, 1968 Japan....................................43/87431
Dec. 12, 1968 Japan....................................43/91228

[52] U.S. Cl..............................................................340/38 L
[51] Int. Cl............................................................G08g 1/01
[58] Field of Search...............................340/38 R, 38 L, 38 S

[56] References Cited

UNITED STATES PATENTS

| | | | |
|---|---|---|---|
| 3,375,493 | 3/1968 | Gottlieb | 340/38 L |
| 3,474,409 | 10/1969 | Gottlieb | 340/38 L |
| 3,492,637 | 1/1970 | Switzer | 340/38 L |
| 3,576,525 | 4/1971 | Prucha | 340/38 L |
| 3,346,856 | 10/1967 | Doble et al. | 340/38 L |
| 3,222,637 | 12/1965 | Gray | 340/38 L |

*Primary Examiner*—Kathleen H. Claffy
*Assistant Examiner*—Randall P. Myers
*Attorney*—Christensen & Sanborn

[57] ABSTRACT

Apparatus for detecting traffic information employs as a vehicle detector a composite inductance loop laid on a road of which traffic information is to be detected. The composite loop consists of a series combination of a large loop portion and a small loop portion. When a vehicle enters the small loop portion, the composite loop suffers a first pulse-like change in the inductance value thereof. As the vehicle moves from the small into the large loop portion the inductance value of the composite loop is reduced to a level lower than the level of the first pulse-like change and kept substantially at that level so long as the vehicle remains inside the large loop portion. When the vehicle is passing the opposite end of the large loop portion, the inductance value thereof again suffers a pulse-like change which is smaller than the first pulse-like change. From such changes in the inductance of the composite loop it will be possible to know traffic informations such as traffic volume, traffic density, vehicle speed, etc. The system may be provided with means for compensating for changes in the inductance of the composite loop caused by changes in environmental conditions.

6 Claims, 7 Drawing Figures

INVENTORS
SHUNSUKE IWAMOTO
RYOHEI KAWASAKI
BY Christensen, Sanborn & Matthews
ATTORNEYS INVENTORS
SHUNSUKE IWAMOTO
BY RYOHEI KAWASAKI
Christensen, Sanborn & Matthews
ATTORNEYS

APPARATUS FOR DETECTING TRAFFIC INFORMATION

This invention relates to an apparatus for detecting traffic information which employs a composite inductance loop as a vehicle detector.

Traffic conditions on a street can be recognized by traffic volume, the degree of stagnation, traffic density, vehicle speed, etc., which are generally referred to as traffic information. Traffic volume is generally defined as the number of vehicles that pass a point of a street per unit period of time; traffic density (which is identical with space occupancy), as the number of vehicles that exist within a predetermined distance or area on the street; the vehicle speed, as the time required for a vehicle to run a predetermined distance or the distance the vehicle can travel for a predetermined period of time.

Traffic volume can be measured by installing a vehicle detector at a point on the street to count the number of vehicles that have passed the point during a predetermined unit period of time. However, such other traffic information as traffic density and vehicle speed which connote the concept of distance cannot be measured by a single vehicle detector installed at a single point on the street. The problem may be solved by providing a pair of vehicle detectors spaced a predetermined distance apart from each other on the street. However, this arrangement requires two detectors, each of which must be provided with a device for operating on the output from the detector, with resulting increase in the installation and maintenance costs.

Accordingly, it is one object of the invention to provide an apparatus for detecting traffic information, which employs a single vehicle detector to obtain various traffic informations.

Another object of the invention is to provide an apparatus for detecting traffic information which employs a single vehicle detector having a composite inductance loop consisting of a large loop portion and a small loop portion connected in series with the large loop portion, with means connected to the composite loop so as to detect the variation of the inductance value of the loop caused by the presence of vehicles in the detection areas provided by the loop portions.

In accordance with the invention, the large loop portion extends a considerably long distance in the direction in which vehicles run, and the small loop portion extends a very short distance in comparison with the length of the large loop portion. The two loop portions are connected in series with each other to form a single composite loop functioning as a vehicle detector, and the opposite ends of the loop are connected to a device for detecting changes in the inductance value thereof. When a vehicle exists within the large loop portion, the inductance value of the composite loop is greater than when there is no vehicle therein. When a vehicle exists within the small loop portion, the inductance of the composite loop becomes greater than when there is a vehicle in the large loop portion since the small loop portion has more turns than the large loop portion. The change in the inductance of the composite loop increases in proportion to the number of vehicles existing within the large loop portion. When a vehicle is passing the small loop portion and the end of the large loop portion the inductance value of the composite loop suffers a pulse-like change. Therefore, if the pulse-like changes caused by vehicles passing through the small loop portion are counted for a predetermined period of time, the traffic volume can be measured. Also, it is possible to measure the speed of a vehicle by measuring the time between the two pulse-like changes caused to occur when the vehicle has entered the field of the composite loop and when the vehicle has left it. In addition, if the magnitude of the change in the inductance of the loop is measured, it is possible to know the number of vehicles that exist within the large loop portion and consequently the traffic density on the street. It is well known in the art that the degree of stagnation can be calculated from the traffic density and vehicle speed.

Experience tells that the inductance value of the loop of this type is also caused to vary as time passes or by changes in weather, moisture and temperature at the place where it is laid. It is therefore necessary to compensate for changes in the loop inductance caused by changes in such environmental conditions. However, in order to make such compensation, it is necessary to determine whether the change in the inductance of the loop has been caused by the presence of a vehicle within the detection field of the loop or by the above-mentioned changes in environmental conditions.

As previously mentioned, when a vehicle has entered the field of the small loop portion, a large pulse-like change occurs in the inductance of the composite loop. If, after a pulse-like change in the inductance of the composite loop was detected, no such pulse-like change has been detected for a predetermined period of time long enough for the vehicle to pass through the loop, it means that there is no vehicle now existing within the detection area of the loop. Under that condition, it is now determined whether it is necessary to make any compensation. Thus in accordance with the invention, since it is only after the absence of vehicles within the detection area of the loop has been confirmed that any compensation is made, it is possible to make very accurate and correct compensation.

The invention will be described in further detail with reference to the accompanying drawing, wherein.

Figure 1:
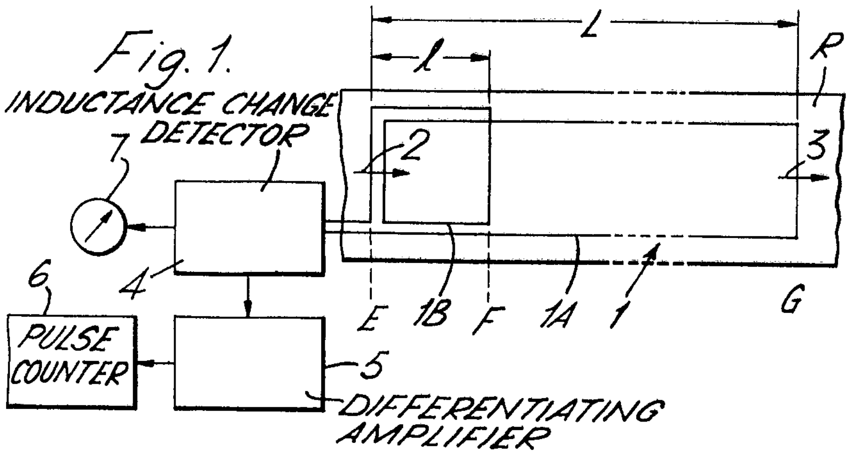
FIG. 1 is a diagram of one embodiment of the invention.

Now referring in detail to the drawings, first to FIG. 1, there is shown a road R, in the paving of which a composite inductance loop 1 is embedded. The composite loop 1 consists of a large loop portion 1A and a small loop portion 1B which is connected in series with the large loop portion. The large loop portion 1A extends a considerably long distance over the road, its length L being, for example, 50 to 150 meters. The small loop portion 1B has a length *l* much shorter than the length L of the large loop portion, for example, one to two meters. In the illustrated embodiment, the small loop portion 1B is placed at the side of the large loop portion where vehicles enter the loop. Vehicles enter the loop 1 in the direction of an arrow 2 and moves out of the same in the direction of an arrow 3.

The vehicle detection area provided by the large loop portion 1A is shown defined between the symbols F and G, and the vehicle detection area provided by the small loop portion 1B, between the symbols E and F.

The composite loop 1 has its opposite ends connected to a detector 4 for detecting changes in the inductance of the composite loop 1. The detector 4 produces an output corresponding to the changes in the inductance of the loop 1 in the form of voltage, current or frequency. An indicator 7 indicates the output values of the detector 4. The output from the detector 4 is also applied to a differentiating amplifier 5, which is so designed as to take out the larger pulse-like change in the inductance of the loop 1. A counter 6 counts the number of the output pulses from the circuit 5.

Figure 2:
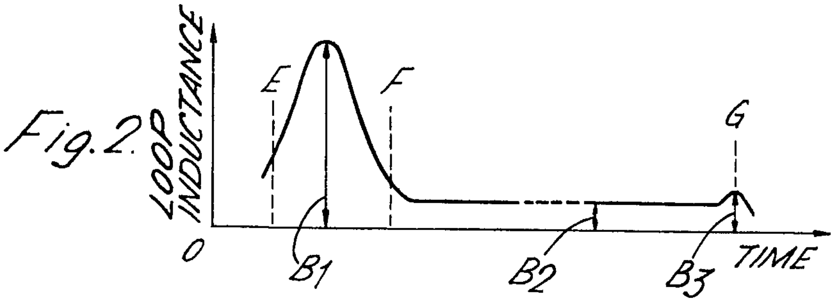
FIG. 2 is a graph illustrating the change in the inductance value of the composite loop in FIG. 1 as a vehicle passes through the loop.
Figures 3, 4:
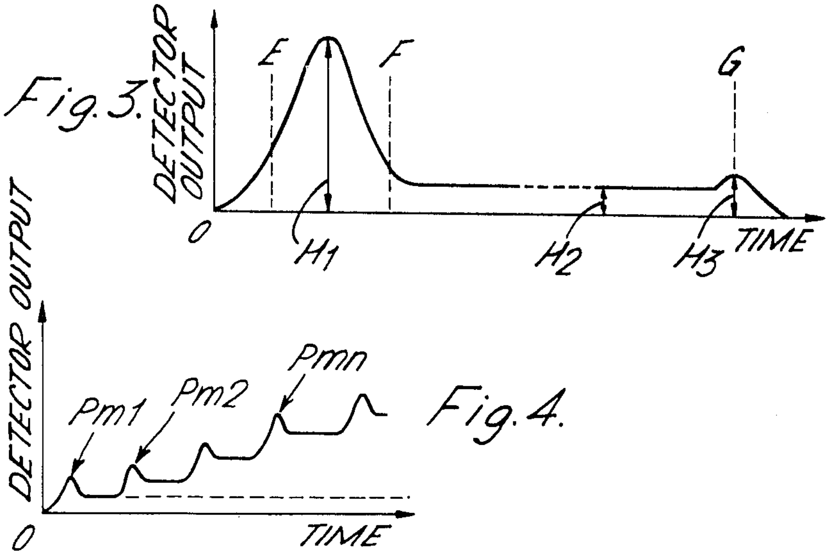
FIG. 3 is a graph illustrating the change in the output of the detector corresponding to the inductance change shown in FIG. 2.
FIG. 4 is a graph illustrating changes in the output of the detector when a plurality of vehicles successively enter the field of the composite loop before the previous vehicles have left the field.

Suppose that one vehicle enters, moves inside and goes out of the detection area defined between E and G in the direction of the arrows 2 and 3. The inductance value of the composite loop varies as the vehicle travels through the loop as shown in FIG. 2. To explain it in detail, when the vehicle is passing the area between E and F, the inductance undergoes a pulse-like change having a high peak value of B1, and as the vehicle passes through the area between F and G, the loop inductance remains at a substantially constant level of B2 until a smaller pulse-like change having a peak value of B3 appears when the vehicle passes the end G of the loop. As is clearly shown, the peak B1 is much higher than the peak B3 because in the area EF the small loop portion 1B has more turns than the large loop portion 1A in the other area FG. As the inductance of the composite loop 1 varies in the above-mentioned manner, the output from the detector 4 (which will sometimes be called the detection signal) varies likewise as shown in FIG. 3. When the vehicle passes the area EF, the detector produces an pulse-like output signal having a peak value of H1 and while the vehicle is travelling between F and G, the output from the detector remains at a substantially constant level H2, and then when the vehicle passes the end G of the loop 1, the output from the detector 4 suffers a smaller pulse-like change having a peak value of H3 which is much lower than the previous peak H1 but higher than the level H2. These changes in the inductance of the loop 1 are indicated by the indicator 7. Thus, if the indicator 7 first points at a considerably high value H1 for a short period of time and then a lower level H2 for a considerably long period of time and finally a value H3 between the peak H1 and the level H2 for a fraction of time, this means that a vehicle enters the loop 1 in the direction 2 and passes therethrough to go out in the direction 3. If the indication changes in a manner opposite to that mentioned just above, it means that a vehicle enters and passes through the loop 1 in the opposite direction. Thus, from the manner of change of the indication on the indicator 7 it is possible to know in which direction the vehicle is running.

The time between occurrence of the pulses H1 and H3 is the time required for the vehicle to travel the distance between E and G. If the distance is known, the speed of the vehicle can be calculated. Also, if the number of pulses having the peak value of H1 are counted for a predetermined period of time, the traffic volume can be directly obtained.

If there are many vehicles simultaneously existing within the area between F and G, the level H2 becomes higher in proportion to the number of vehicles. Therefore, from the height of the output level H2 it is possible to know the number of vehicles existing in the area FG and consequently the traffic density or space occupancy.

The outputs H1 and H3 can be easily detected by applying the output from the detector 4 to the differentiating amplifier 5. To be able to detect both outputs H1 and H3, the input level of the circuit 5 is so set as to enable differentiation of the two outputs from the detector 4; and to detect the output H1 alone, the input level of the circuit 5 is so set as to enable differentiation of that output alone from the detector 4.

As previously mentioned, by counting then number of the differentiated pulses from the circuit 5 so set as to detect output H1 alone, it is possible to measure the traffic volume, that is, the number of vehicles that pass the loop for a unit period of time.

Figure 5:
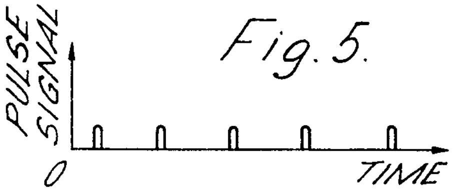
FIG. 5 is a graph showing the differentiated output of the detector as shown in FIG. 4.

Suppose that while a vehicle is still travelling within the area between F and G, a succeeding vehicle coming in the direction 2 has entered the area between E and F. The increment B1 in the inductance of the loop 1 and consequently the output level H1 of the detector 4 caused by the entrance of the succeeding vehicle into the area EF is added to or piled upon the increment B2 or the level H2 caused by the presence of the preceding vehicle within the area FG. This is clearly shown in FIG. 4. The peak P*m*1 is caused by the entrance of a first vehicle into the detection area EF, and the next peak P*m*2 is caused by a succeeding vehicle having entered the area EF while the previous vehicle is still travelling within the area FG. It is seen that the peak P*m*2 rides on the increment or level H2 caused by the preceding vehicle having now moved from the area EF into the area FG. Thus, the peaks P*m*1, P*m*2, . . . P*m*n successively occur as vehicles successively enter the area EF while all the preceeding vehicles are still travelling within the area FG. Since the output from the detector 4 as shown in FIG. 4 is applied to the differentiating amplifier 5, the amplifier 5 produces differentiated output pulses as shown in FIG. 5. By counting the number of these pulses by means of the counter 6 it is possible to know the number of vehicles passing the loop 1.

Figure 6:
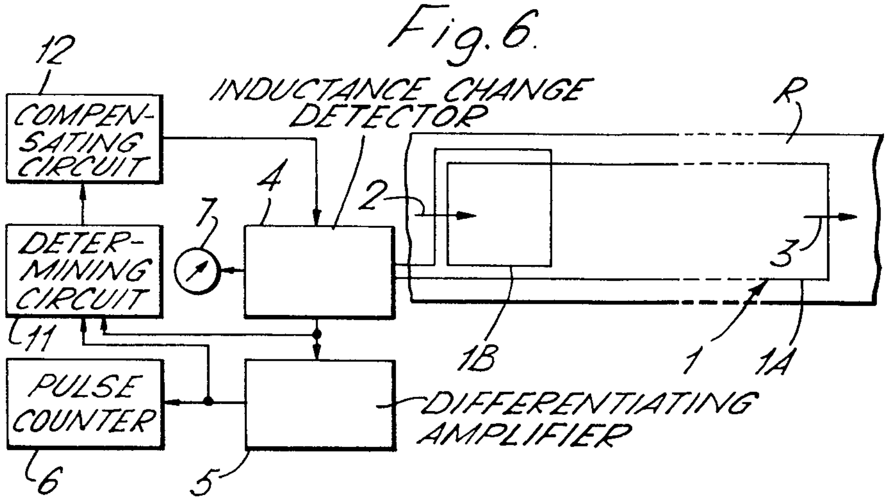
FIG. 6 is a diagram similar to FIG. 1 but with means for compensating for changes in the inductance of the loop caused by changes in environmental conditions.
Figure 7:
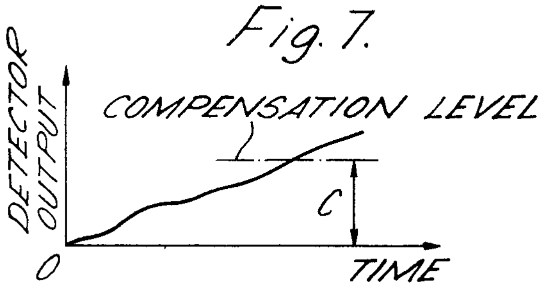
FIG. 7 is a graph showing the change in the output of the detector caused by changes in environmental conditions.

As previously mentioned, the inductance of the loop 1 is influenced by changes in environmental conditions, such as temperature and moisture in the place where the loop is installed. FIG. 6 shows the system of the invention with a circuit for compensating for changes in the inductance of the loop 1 caused by changes in such environmental conditions. Here, the output from the detector 4 is applied to a determining circuit 11 as well as to the differentiator 5, and the output from the determining circuit 11 actuates an automatic compensating circuit 12 to make necessary compensation for errors in the operation of the detector 4. The circuit 11 is so designed as to determine whether the circuit 5 has produced an output pulse during a predetermined period of time T after the previous pulse was produced, and whether, after lapse of the time T, the output from the detector 4 has reached a predetermined level which requires compensation. The time T is set to a time longer than that required for a vehicle to be able to travel the distance between E and G at a average speed. Therefore, if the differentiator 5 has produced no output pulse during the time T, it means that after lapse of the time T there is no vehicle existing any longer within the area EG. Under the condition, if the inductance of the loop 1 changes, such change may be considered as having been caused by changes in environmental conditions and not by the presence of vehicles in the loop. Suppose that the output from the detector 4 varies as shown in FIG. 7 as time passes, and that when the output exceeds a level C, compensation is required. Then, if after lapse of the time T the output from the detector 4 has exceeded the level C, the change in the inductance of the loop 1 caused by changes in the environmental conditions is considered as having reached the level where compensation is necessary. This is determined by the circuit 11. When the circuit 11 has determined that compensation is necessary, it produces an output to actuate the compensating circuit 12 to reduce the output level of the detector 4.

In the above arrangement, however, if due to traffic stagnation any succeeding vehicle cannot enter the loop 1 and consequently no succeeding pulse has been received by the determining circuit 11 before the period of time T has passed, it seems as if the output from the detector 4 which was actually caused by the presence of preceding vehicles within the loop had been caused by changes in environmental conditions, and an erroneous compensation would be made. To avoid such unnecessary compensation, the length of the time T must be determined with due consideration given to the present traffic condition on the street. For example, when traffic stagnation or stoppage has occurred, the operation of the circuit 11 or 12 may be stopped, or the time T may be set to a time long enough to allow succeeding vehicles to enter the loop 1.

The operation of compensation may also be performed manually instead of automatically. For example, if an operator watching the indication on the indicator 7 observes a swing of the needle of the indicator and thereafter no such swing of the needle during the period of time T, he may manually actuate the compensating circuit 12.

What we claim is:

1. An apparatus for detecting vehicles on a street and providing an output signal useful for obtaining various types of traffic information therefrom, including traffic volume, traffic density, vehicle speed and the like, comprising:

a. a composite inductance loop comprising a large loop portion and a small loop portion, said portions being connected in series, said composite inductance loop being installed in said street such that said large and small loop portions cover different detection areas thereof, and b. a detecting means connected to said composite inductance loop to produce said output signal in response to changes in the inductance value of said composite inductance loop caused by the presence of a vehicle in said detection areas on said street.

2. The apparatus of claim 1, wherein the relative lengths of said large and small loop portions are such that the detection area of said large loop portion extends over a much greater length of said street than the detection area of said small loop portion.

3. The apparatus of claim 1, further including means coupled to said detecting means for indicating the value of said output signal as a vehicle passes through said detection areas.

4. The apparatus of claim 1, wherein said detecting means produces a pulse-like output signal in response to the presence of a vehicle in the detection area provided by said small loop portion, and further including means for counting the number of said pulse-like output signals.

5. The apparatus of claim 4, further including a differentiator connected to the output of said detecting means to differentiate the pulse-like output signals therefrom to produce corresponding differentiated pulses, and wherein said counting means comprises a pulse counter for counting the number of said differentiated pulses.

6. The apparatus of claim 1, wherein said detecting means produces a pulse-like output signal in response to the presence of a vehicle in the detection area provided by said small loop portion, and further including a differentiator connected to the output of said detecting means to differentiate the pulse-like output signals therefrom to produce corresponding differentiated pulses, and a determining means for enabling the operation of a means compensating for changes in the output of said detecting means when said output exceeds a predetermined compensation level and none of said differentiated pulses have been produced for a predetermined period of time.

* * * * *